(12) United States Patent
Kim et al.

(10) Patent No.: US 11,628,779 B2
(45) Date of Patent: Apr. 18, 2023

(54) HEAD-UP DISPLAY FOR VEHICLE HAVING REINFORCED ASSEMBLY STRUCTURE

(71) Applicant: HYUNDAI MOBIS Co., Ltd., Seoul (KR)

(72) Inventors: Byung Ki Kim, Yongin-si (KR); Chan Seo Goo, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 312 days.

(21) Appl. No.: 17/126,437

(22) Filed: Dec. 18, 2020

(65) Prior Publication Data

US 2021/0188188 A1 Jun. 24, 2021

(30) Foreign Application Priority Data

Dec. 20, 2019 (KR) ........................ 10-2019-0172514

(51) Int. Cl.
*B60R 11/02* (2006.01)
*B60K 35/00* (2006.01)
*B60R 11/00* (2006.01)

(52) U.S. Cl.
CPC .......... *B60R 11/0235* (2013.01); *B60K 35/00* (2013.01); *B60K 2370/1529* (2019.05); *B60K 2370/68* (2019.05); *B60K 2370/91* (2019.05); *B60R 2011/0077* (2013.01)

(58) Field of Classification Search
CPC ........ B60R 11/0235; B60R 2011/0077; B60K 35/00; B60K 2370/1529; B60K 2370/91; B60K 2370/68
USPC ........................................................ 348/837
See application file for complete search history.

(56) References Cited

U.S. PATENT DOCUMENTS

| 6,181,404 | B1 * | 1/2001 | Gaffney | G02F 1/13452 439/55 |
| 2006/0164230 | A1 * | 7/2006 | DeWind | B60K 37/06 340/461 |
| 2013/0314853 | A1 * | 11/2013 | Wang | H05K 5/03 361/679.01 |
| 2018/0218654 | A1 * | 8/2018 | Hashimoto | B60R 11/0229 |

* cited by examiner

*Primary Examiner* — Joseph G Ustaris
*Assistant Examiner* — Matthew David Kim
(74) *Attorney, Agent, or Firm* — H.C. Park & Associates, PLC

(57) ABSTRACT

A head-up display for a vehicle in which an assembly structure of a screen and a picture generation unit (PGU) is reinforced. The head-up display for a vehicle according to one embodiment includes a lower case embedded with a board assembly, and a screen connected to the lower case in a plurality of directions and snap-fit-coupled to the lower case by passing through the board assembly in at least one direction.

5 Claims, 16 Drawing Sheets

HEAD-UP DISPLAY FOR VEHICLE HAVING REINFORCED ASSEMBLY STRUCTURE

CROSS-REFERENCE TO RELATED APPLICATION

This application claims priority to and the benefit of Korean Patent Application No. 10-2019-0172514, filed on Dec. 20, 2019, which is hereby incorporated by reference for all purposes as if set forth herein.

BACKGROUND

Field

Exemplary embodiments relate to a head-up display for a vehicle, and more particularly, to a head-up display for a vehicle in which an assembly structure of a screen and a picture generation unit (PGU) is reinforced.

Discussion of the Background

In recent years, the automobile market is rapidly growing with the trend of favoring intelligent vehicles equipped with advanced information technology (IT) and convenient functions as well as the improvement of original functions of vehicles. In such a trend, with the spreading of the electronic equipment of vehicles, functions, in which IT and wireless communication technology are integrated, are rapidly increasing.

In particular, products that support the driver's stability and convenience are being released, and as one of the products, a head-up display (HUD) for a vehicle is attracting attention as a variety of product lines.

In general, a vehicle head-up display is a device that displays an image including a vehicle speed, a fuel level, road guidance information, and the like on a windshield that is a front window of a vehicle.

Among components constituting such a vehicle head-up display, a screen is assembled using coupling screws disposed in three directions.

However, in an assembly structure of such a screen, when rigidity in an unfastened direction is weak in a vibration analysis, there is a problem in that friction and abrasion between the screen and an aspheric mirror occur due to vibration.

Meanwhile, the conventional liquid crystal display (LCD) is assembled and fixed using a separate upper cover. The upper cover pushes the LCD downward, but when a pushing load is excessively applied, an excessive external force is applied to an LCD panel. Accordingly, a problem such as smearing or color bleeding may occur on the LCD screen.

The above information disclosed in this Background section is only for enhancement of understanding of the background of the invention and, therefore, it may contain information that does not constitute prior art.

SUMMARY

Exemplary embodiments of the present invention provide a head-up display for a vehicle in which an assembly structure of a screen and a picture generation unit is reinforced through various embodiments.

Additional features of the invention will be set forth in the description which follows, and in part will be apparent from the description, or may be learned by practice of the invention.

An exemplary embodiment of the present invention provides a head-up display for a vehicle having a reinforced assembly structure including a lower case embedded with a board assembly, and a screen connected to the lower case in a plurality of directions and snap-fit-coupled to the lower case by passing through the board assembly in at least one direction.

The screen may be bolt-coupled to the lower case in the plurality of directions with the board assembly interposed therebetween.

The screen may include a hook portion which passes through the board assembly and is detachable in one direction of the lower case.

The hook portion may be formed to protrude in a direction different from that of a coupling hole formed in the screen.

The hook portion may have a fixing step of which a lower end protrudes in one direction, and a width of the fixing step may be gradually decreased in a direction toward a lower portion thereof.

The lower case may have a connection hole through which the hook portion passes, and a stepped portion corresponding to the fixing step may be formed at one end inside the connection hole.

The stepped portion may have an inclined structure of which a width is gradually increased in a direction toward a lower portion thereof.

Another exemplary embodiment of the present invention provides a head-up display for a vehicle having a reinforced assembly structure including a lower case embedded with a board assembly, and a screen including a plurality of discontinuous annular snap joints which are in a state of being primarily fixed by passing through the board assembly and are secondarily snap-fit-coupled to the lower case.

The discontinuous annular snap joint may include a first stepped portion formed to protrude from a lower end of the screen in the form of a hollow bar and snap-fit-coupled to the lower case, and a second stepped portion disposed to be spaced apart from the first stepped portion and fixed to the board assembly.

A lower end of the first stepped portion may have a structure protruding in one direction and have an inclined structure of which a width is gradually decreased in a direction toward a lower portion thereof.

The second stepped portion may protrude outward in a form surrounding a circumference of the discontinuous annular snap joint, and a portion thereof in contact with the board assembly may have a flat cross section.

The discontinuous annular snap joint may be integrally formed with the screen.

Another exemplary embodiment of the present invention provides a head-up display for a vehicle having a reinforced assembly structure including a picture generation unit which includes a lower cover configured to fix a liquid crystal display (LCD) in X-, Y-, and Z-axis directions.

The lower cover may have a structure snap-fit-coupled with the LCD.

The lower cover may include a plurality of X-axis line stoppers formed at a left upper end of a front upper end, a rear upper end, the left upper end, and a right upper end of the lower cover to seat a left side surface of the LCD, a plurality of Y-axis line stoppers formed at the rear upper end to seat a rear side surface of the LCD, and a plurality of fixing hooks formed at the front and right upper ends to push the LCD in directions of the X- and Y-axis line stoppers.

A coupling portion of the fixing hook in contact with the LCD may have a structure inclined upward.

An inclination angle of the coupling portion may be an acute angle.

The lower cover may have an opening in a central portion thereof, and seating surfaces in surface contact with the LCD may be formed around the opening.

The lower cover may include a guide member configured to fix an LCD cable.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

The advantages and features of the present invention and methods for accomplishing the same will be more clearly understood from embodiments to be described in detail below with reference to the accompanying drawings. However, the present invention is not limited to the following embodiments but may be implemented in various different forms. Rather, these embodiments are provided only to complete the disclosure of the present invention and to allow those skilled in the art to understand the category of the present invention. The present invention is defined by the category of the claims. Meanwhile, terms used in this specification are to describe the embodiments and are not intended to limit the present invention. As used herein, singular expressions, unless defined otherwise in context, include plural expressions. It will be further understood that the terms "comprises," "comprising," "includes," and/or "including," when used herein, specify the presence of stated components, steps, operations, and/or elements, but do not preclude the presence or addition of one or more other components, steps, operations, and/or elements.

A head-up display for a vehicle according to the present invention is basically provided in a vehicle and is installed at a lower portion of a windshield. In the present invention, a coupling structure between components of such a head-up display device for a vehicle will be described through first to third embodiments.

Here, a configuration related to the features characteristics of the present invention will be mainly described, and a configuration separate from the features will be omitted.

Hereinafter, exemplary embodiments of the present invention will be described in detail with reference to the accompanying drawings.

First Embodiment

Figure 1:
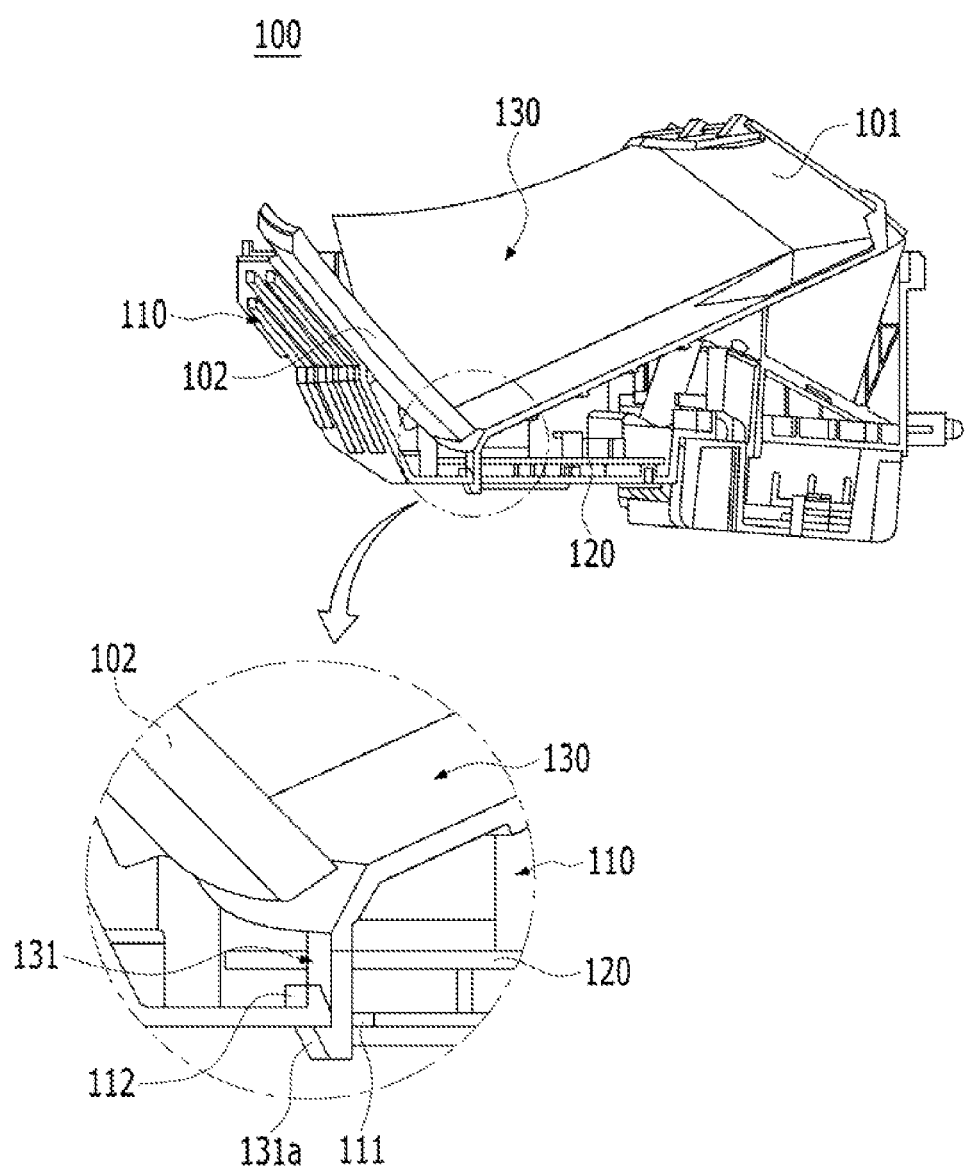
FIG. 1 is a view illustrating a screen and a lower case that are coupled with a board assembly interposed therebetween in a head-up display for a vehicle according to a first embodiment of the present invention.
Figure 2:
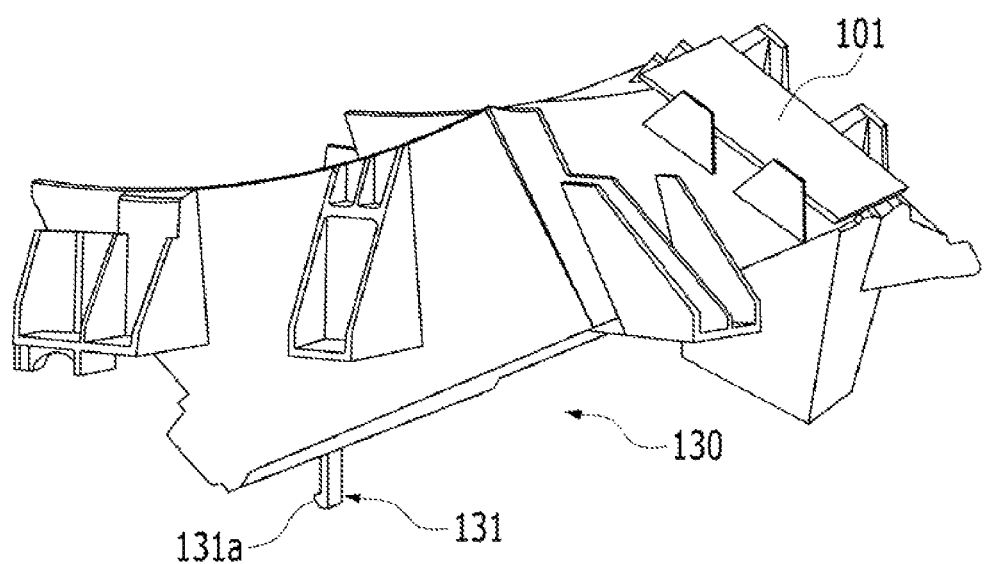
FIGS. 2 and 3 are views illustrating the screen in the head-up display for a vehicle according to the first embodiment of the present invention.
Figure 3:
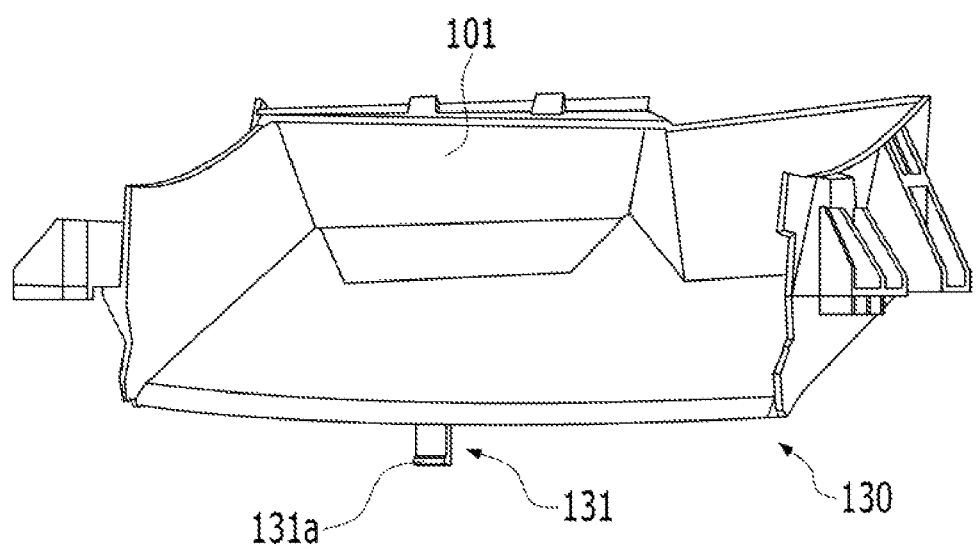

FIGS. 1 to 3 are views illustrating a screen and a lower case that are coupled with a board assembly interposed therebetween in a head-up display for a vehicle according to a first embodiment of the present invention.

Referring to FIGS. 1 to 3 together, a screen 130 is coupled to a lower case 110. In this case, the screen 130 should have a predetermined gap with an aspheric mirror 102. This is because it is necessary to secure a space required for a tilting operation of the aspheric mirror 102.

Accordingly, it is important that the screen 130 is fixed to the lower case 110 so as to not be shaken. When the screen 130 is not firmly fixed to the lower case 110, a separation gap occurs in a coupling portion due to vibration caused by an external impact.

Then, due to the separation gap, a required gap between the screen 130 and the aspheric mirror 102 is reduced, and the screen 130 and the aspheric mirror 102 rub against each other, thereby causing abrasion.

In this case, a folding mirror 101 is mounted on the screen 130.

When a mounted portion of the folding mirror 101 is shaken due to insufficient rigidity of the screen 130, an entire image of the head-up display 100 for a vehicle is shaken. As a result, the shaking affects the optical performance.

Accordingly, in the head-up display 100 for a vehicle according to the first embodiment of the present invention, screws are coupled only in three directions around the screen 130, and a hook portion 131 is coupled in a snap-fit structure in another direction, thereby increasing assembly rigidity.

Here, the directions refer to front, rear, left, and right sections that do not overlap each other with respect to a point. As the number of the directions is increased, the rigidity of the coupling portion may be increased. However, the present invention is characterized in that not only is rigidity secured by simply increasing the number of the directions, costs can be reduced while the rigidity is maintained.

The screen 130 may be bolt-coupled to the lower case 110 in a plurality of directions with the board assembly 120 interposed therebetween.

In this case, the screen 130 includes the hook portion 131 that passes through the board assembly 120 and is detachable in one direction of the lower case 110.

The hook portion may be formed to protrude in a direction different from that of a coupling hole (not shown) formed in the screen 130. Here, the coupling hole refers to a connection portion of the screen 130 which is bolt-coupled.

Accordingly, the hook portion 131 is disposed in a direction different from that of another portion to be bolt-coupled, thereby securing the assembly rigidity of the screen 130 at a low cost.

The hook portion 131 has a fixing step 131a of which a lower end protrudes in one direction. The fixing step 131a has an inclined structure of which a width is gradually decreased in a direction toward a lower portion thereof.

The lower case 110 has a connection hole 111 through which the hook portion 131 passes. A stepped portion 112 corresponding to the fixing step 131a is formed at one end inside the connection hole 111.

The stepped portion 112 has an inclined structure of which a width is gradually increased in a direction toward a lower portion thereof. Due to the structure, the screen 130 can be forcibly fitted into the lower case 110.

In this case, a diameter of the connection hole 111 may correspond to the width of the fixing step 131a of the hook portion 131.

This is because when the diameter of the connection hole 111 is greater than the width of the fixing step 131a, a coupling force of the hook portion 131 is weakened, and when the diameter of the connection hole 111 is less than the width of the fixing step 131a, insertion of the hook portion 131 itself is difficult.

Therefore, the diameter of the connection hole 111 may correspond to the width of the fixing step 131a of the hook portion 131. As a result, the fixing step 131a and the stepped portion 112 are snap-fit-coupled through force fitting and thus have structures that are simply and easily assembled to each other.

Second Embodiment

Figure 4:
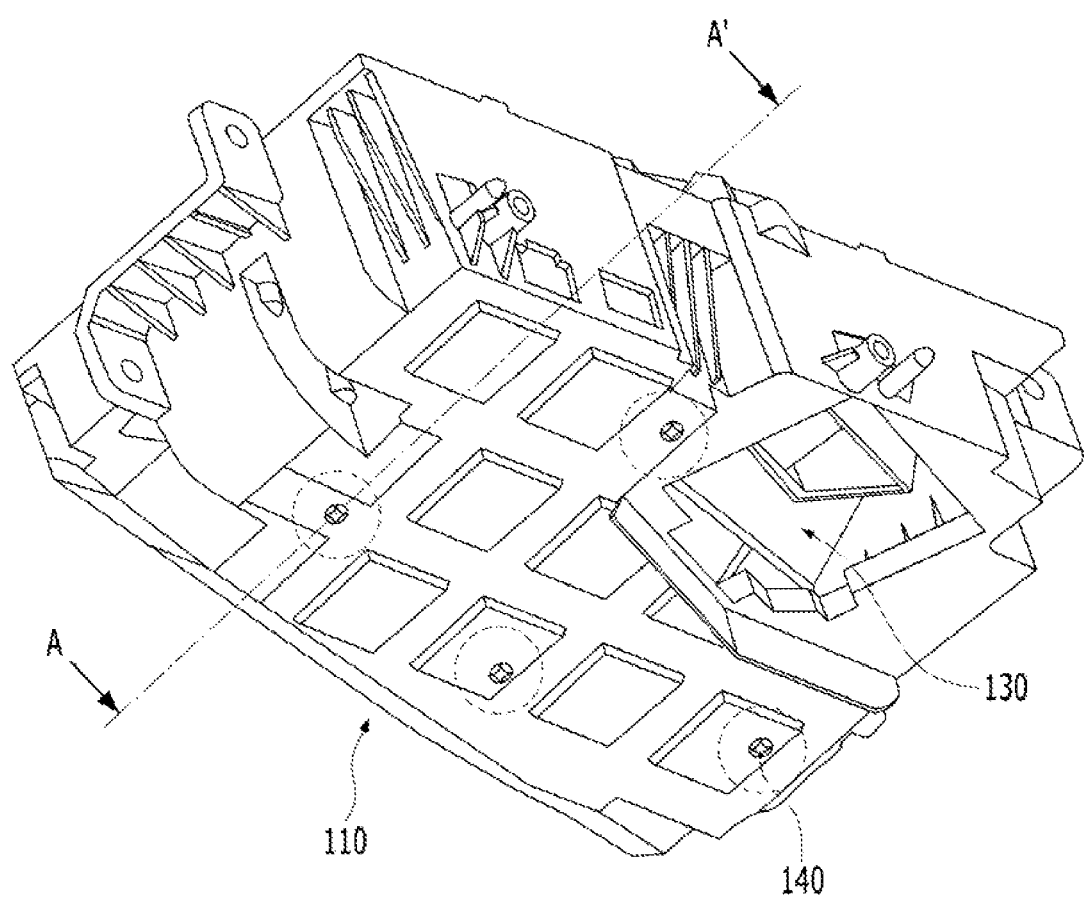
FIG. 4 is a view illustrating a lower end of a lower case coupled to a screen in a head-up display for a vehicle according to a second embodiment of the present invention.
Figure 5:
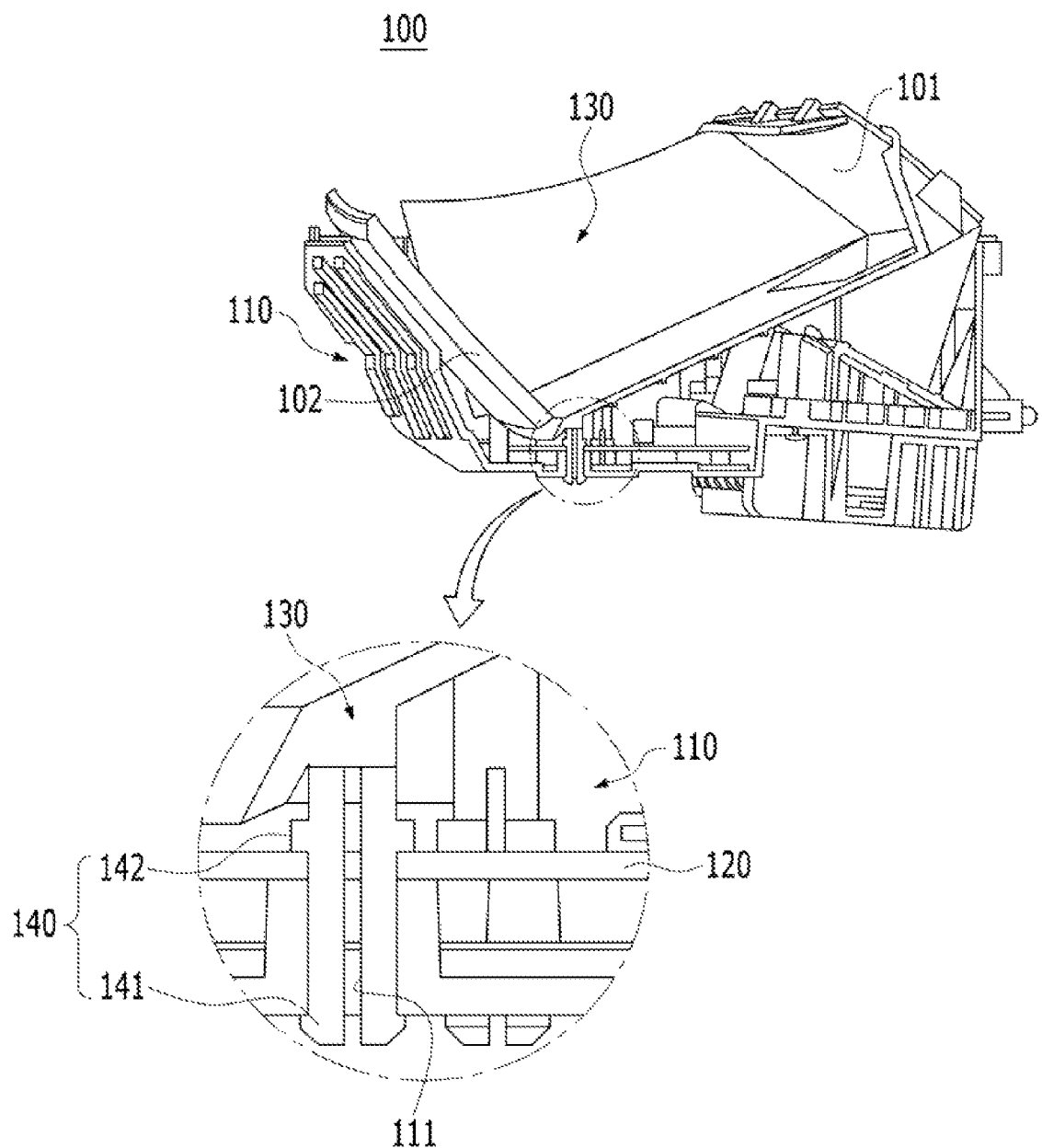
FIG. 5 is a view illustrating a cross section taken along line A-A' of FIG. 4.

FIG. 4 is a view illustrating a lower end of a lower case coupled to a screen in a head-up display for a vehicle according to a second embodiment of the present invention, and FIG. 5 is a view illustrating a cross section taken along line A-A' of FIG. 4.

Referring to FIGS. 4 and 5 together, a screen 130 includes a plurality of discontinuous annular snap joints 140 which are in a state of being primarily fixed by passing through a board assembly 120 and are secondarily snap-fit-coupled to a lower case 110.

Here, the snap joint 140 is formed to protrude from a lower end of the screen 130 in the form of a hollow bar. The snap joint 140 is integrally formed with the screen 130.

The snap joint 140 includes a first stepped portion 141 and a second stepped portion 142.

The first stepped portion 141 is snap-fit-coupled to the lower case 110.

A lower end of the first stepped portion 141 has a structure protruding in one direction. In this case, the lower end of the first stepped portion 141 has an inclined structure of which a width is gradually decreased in a direction toward a lower portion thereof.

The second stepped portion 142 is disposed coaxially with the first stepped portion 141 so as to be spaced apart therefrom. The second stepped portion 142 is fixed to the board assembly 120.

The second stepped portion 142 protrudes outward in a form surrounding a circumference of the snap joint 140. In this case, in the second stepped portion 142, a portion thereof in contact with the board assembly 120 has a flat cross section.

Figure 6:
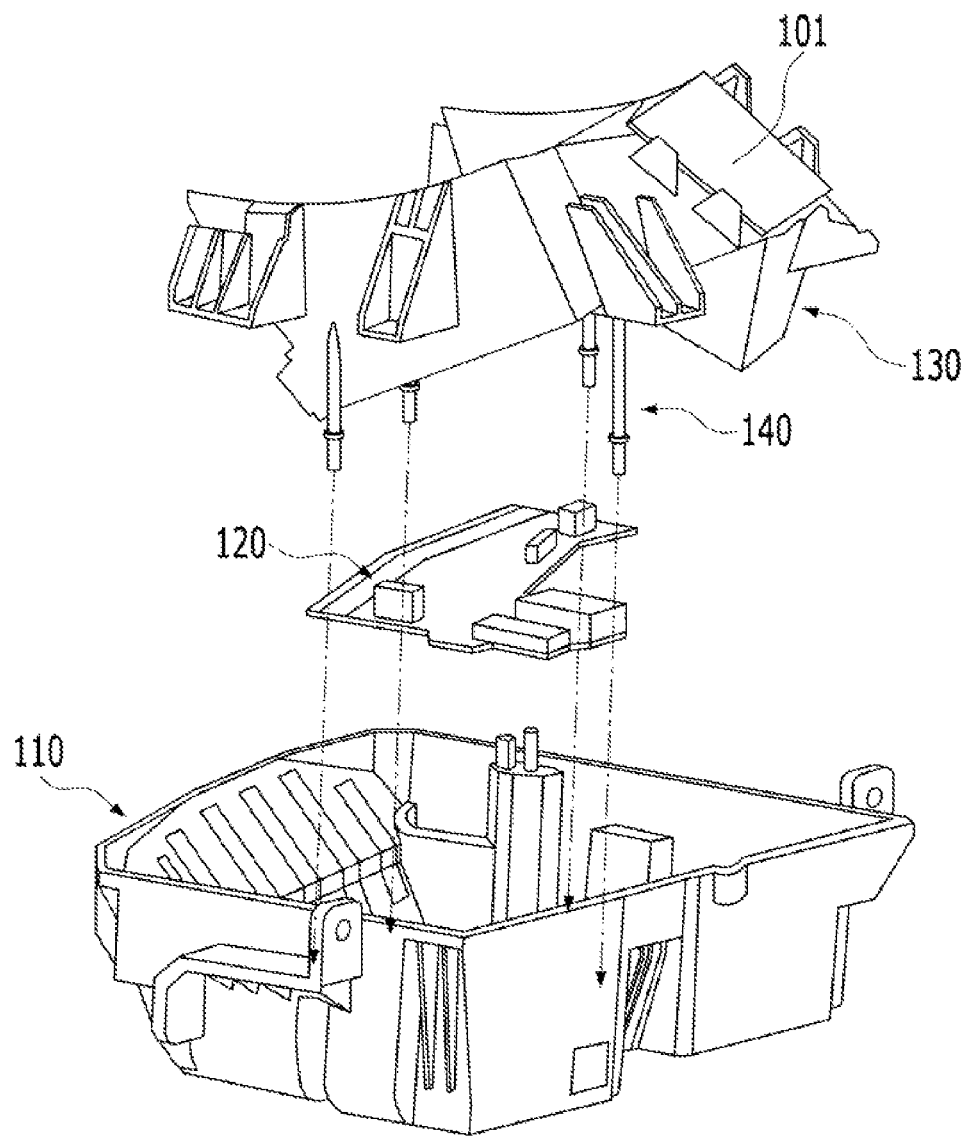
FIG. 6 is a view illustrating the screen and the lower case that are coupled with a board assembly interposed therebetween in the head-up display for a vehicle according to the second embodiment of the present invention.

FIG. 6 is a view illustrating the screen and the lower case that are coupled with the board assembly interposed therebetween in the head-up display for a vehicle according to the second embodiment of the present invention.

Referring to FIG. 6, the screen 130 and the lower case 110 are assembled to each other through the snap joint 140 without using a separate screw.

Here, the snap joints 140 are disposed in four different directions so that the screen 130 and the lower case 110 may be firmly fixed.

The board assembly 120 is fixed in a form through which the snap joint 140 passes and thus is mounted between the screen 130 and the lower case 110. In this case, the board assembly 120 includes through-holes (not shown) through which the snap joints 140 pass.

Figure 7:
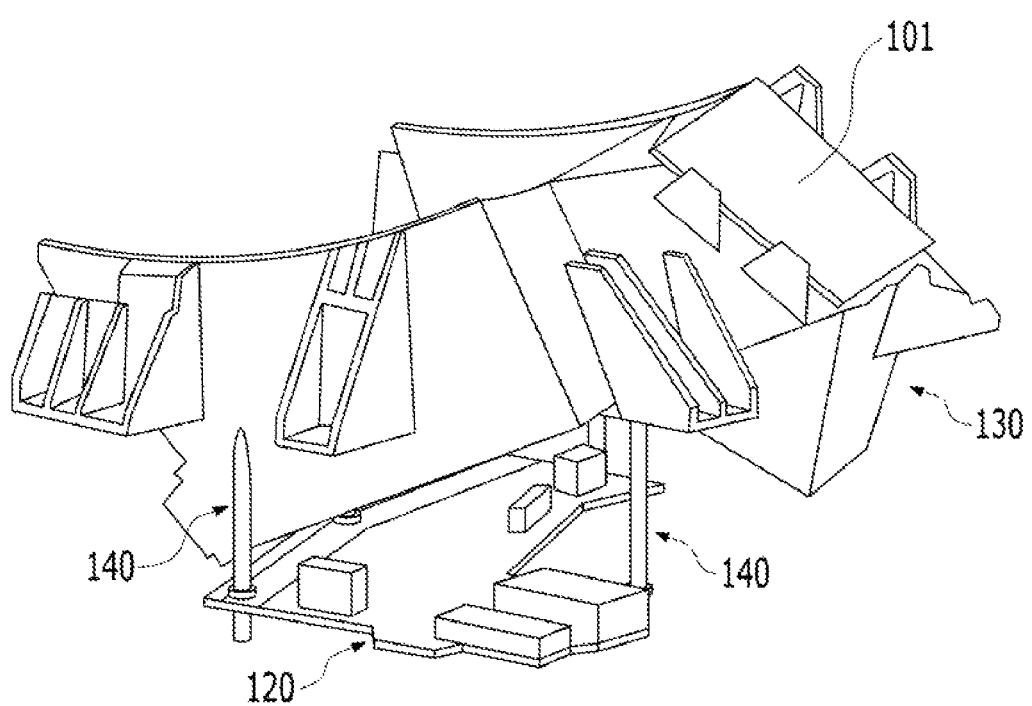
FIG. 7 is a view illustrating the board assembly and the screen in the head-up display for a vehicle according to the second embodiment of the present invention.

FIG. 7 is a view illustrating the board assembly and the screen in the head-up display for a vehicle according to the second embodiment of the present invention.

Referring to FIG. 7, the snap joint 140 formed in the screen 130 is fitted into and coupled to the through-hole of the board assembly 120. In this case, the snap joint 140 has a hollow shape, and gaps are alternately formed in an end portion thereof.

When the snap joint 140 is to be removed from the through hole, the end portion of the snap joint 140 only needs to be contracted.

When the snap joint 140 is to be mounted in the through-hole, since the snap joint 140 is spread outward in a state passing through the through-hole, the snap joint 140 is fixed to the through-hole without a separate operation.

Third Embodiment

Figure 8:
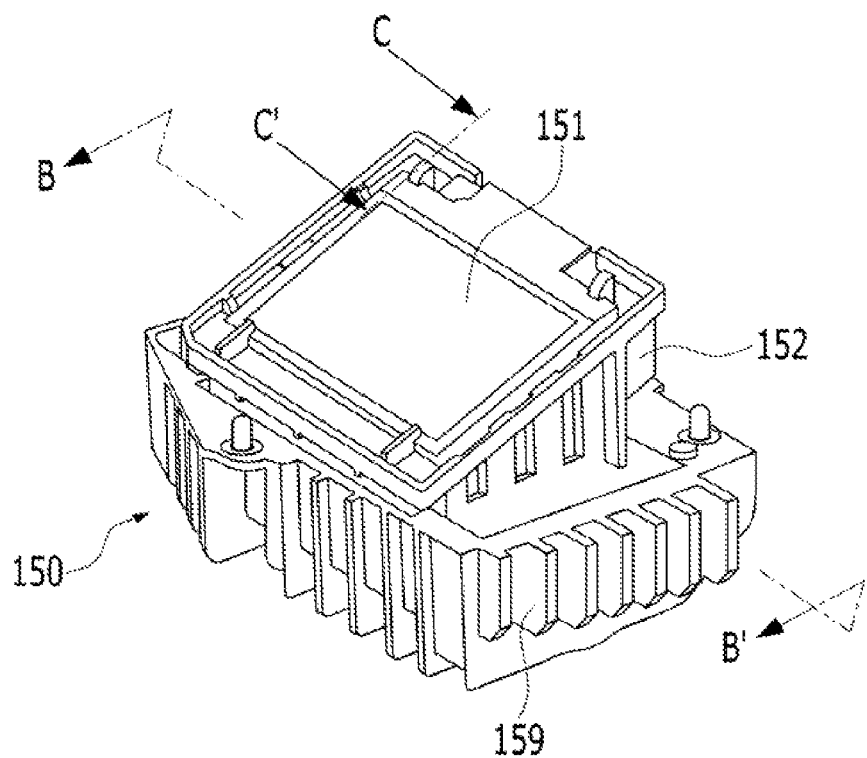
FIG. 8 is a view illustrating a picture generation unit in a head-up display for a vehicle according to a third exemplary embodiment of the present invention.
Figure 9:
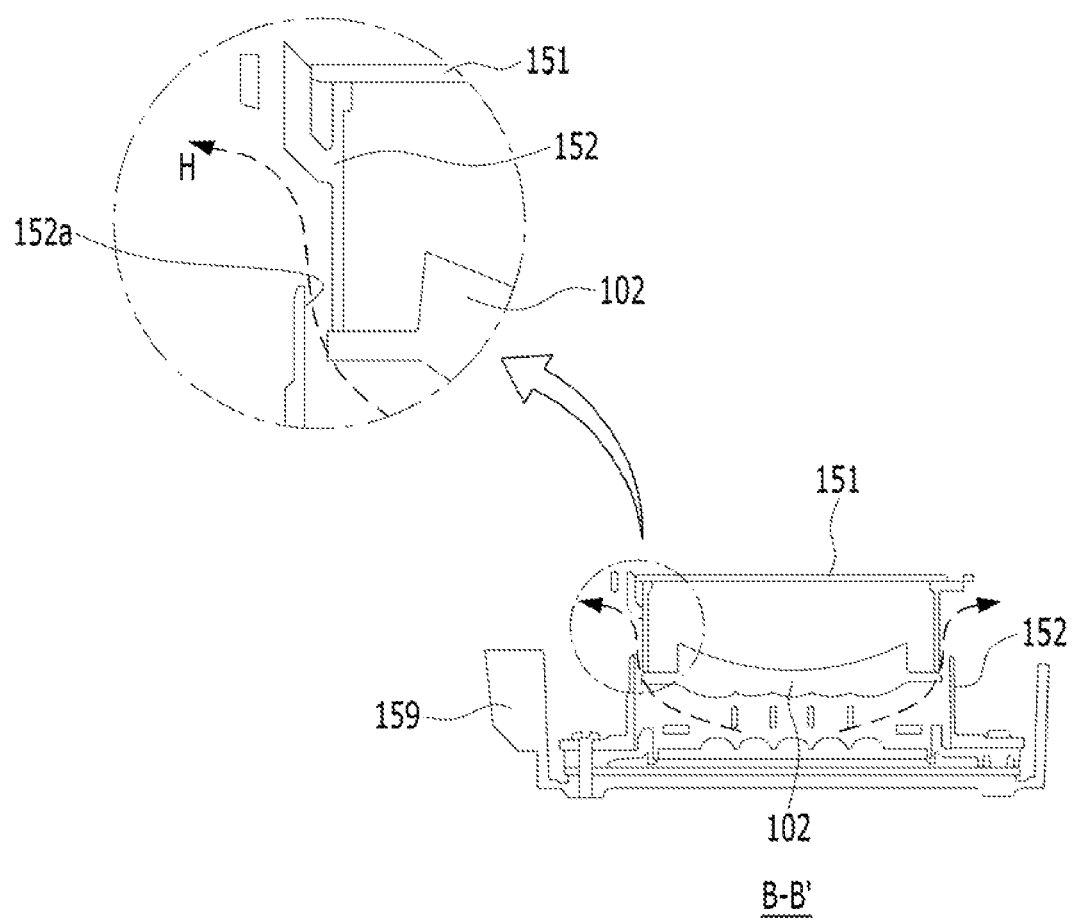
FIG. 9 is a view illustrating a cross section taken along line B-B' of FIG. 8.

FIG. 8 is a view illustrating a picture generation unit in a head-up display for a vehicle according to a third exemplary embodiment of the present invention, and FIG. 9 is a view illustrating a cross section taken along line B-B' of FIG. 8.

First, referring to FIG. 8, a picture generation unit 150 generates an image including a head-up display (HUD) information. A liquid crystal display (LCD) 151 of the picture generation unit 150 outputs an image to be projected on a windshield (not shown).

The picture generation unit 150 includes a lower cover 152 that is mounted on a heat sink 159 and fixes the LCD 151 in X-, Y-, and Z-axis directions. That is, the lower cover 152 has a structure snap-fit-coupled with the LCD 151.

Next, referring to FIG. 9, vent holes 152a are formed in side ends of the lower cover 152 to discharge heat H generated inside the picture generation unit 150.

This vent hole 152a increases a heat dissipation effect. The vent hole 152a has a structure that prevents light leakage. That is, the vent hole 152a has a stepped structure so that light does not leak out directly from the inside of the picture generation unit 150.

Figure 10:
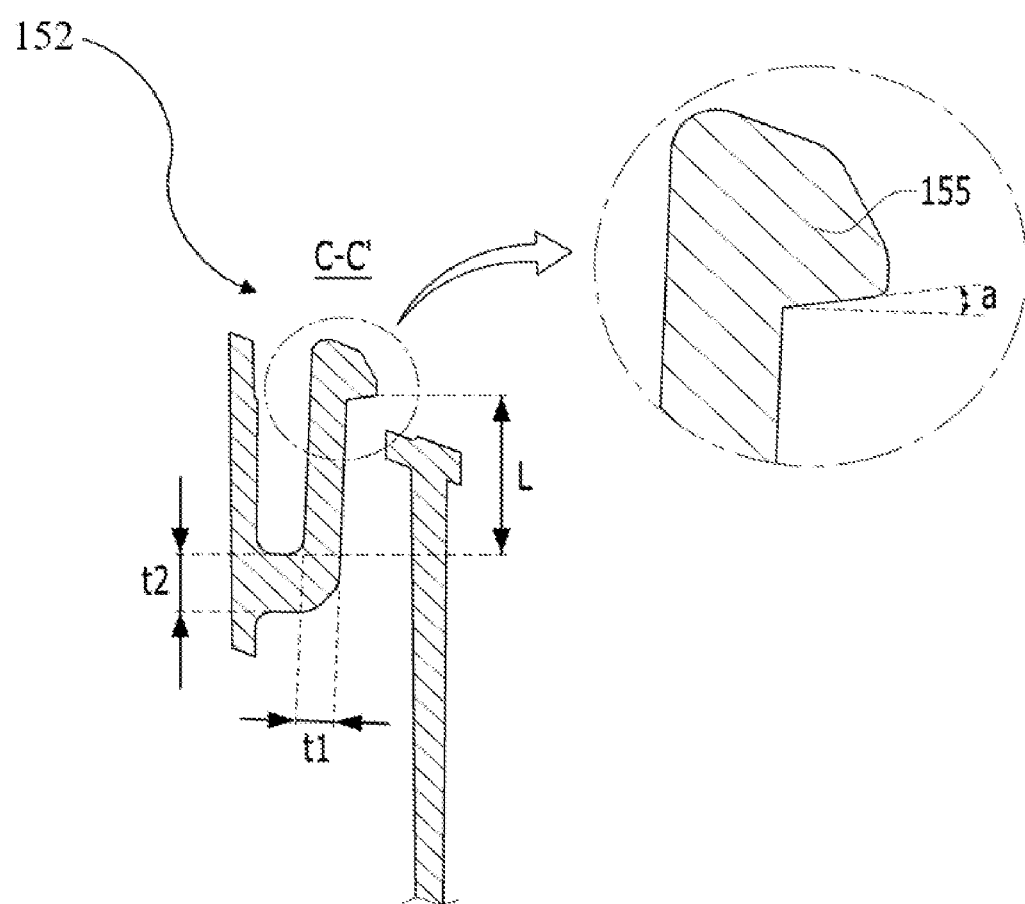
FIG. 10 is a view illustrating a cross section taken along line C-C' of FIG. 8.

FIG. 10 is a view illustrating a cross section taken along line C-C' of FIG. 8.

Referring to FIG. 10, the lower cover 152 includes fixing hooks 155 that push the LCD (see 151 of FIG. 9) in the X-, Y-, and Z-axis directions to fix the LCD 151.

In this case, the fixing hook 155 has a structure in which a coupling portion thereof in contact with the LCD (see 151 of FIG. 9) is inclined upward. Here, the coupling portion refers to a protrusion in contact with the LCD (see 151 of FIG. 9).

An inclination angle a of the coupling portion of the fixing hook 155 may be an acute angle. Due to the structure of the fixing hook 155, the LCD (see of 151 FIG. 9) may be fixed by being pressed downward.

A length L from the coupling portion to a lower end of the fixing hook 155 may be 9.71 mm, and the length L may be a length that is able to maintain enough strength to firmly fix the LCD (see of 151 in FIG. 9). The length L from the coupling portion to the lower end of the fixing hook 155 may vary according to the shape of the picture generation unit and the internal coupling structure thereof.

A side thickness t1 of the fixing hook 155 is 2.03 mm, which corresponds to a thickness of a basic frame of the lower cover 152 facing the fixing hook 155.

A thickness t2 of a connection portion of the fixing hook 155 is 3.5 mm, and the fixing hook 155 has a thickness which is thick enough to be firmly fixed to the lower cover 152.

Figure 11:
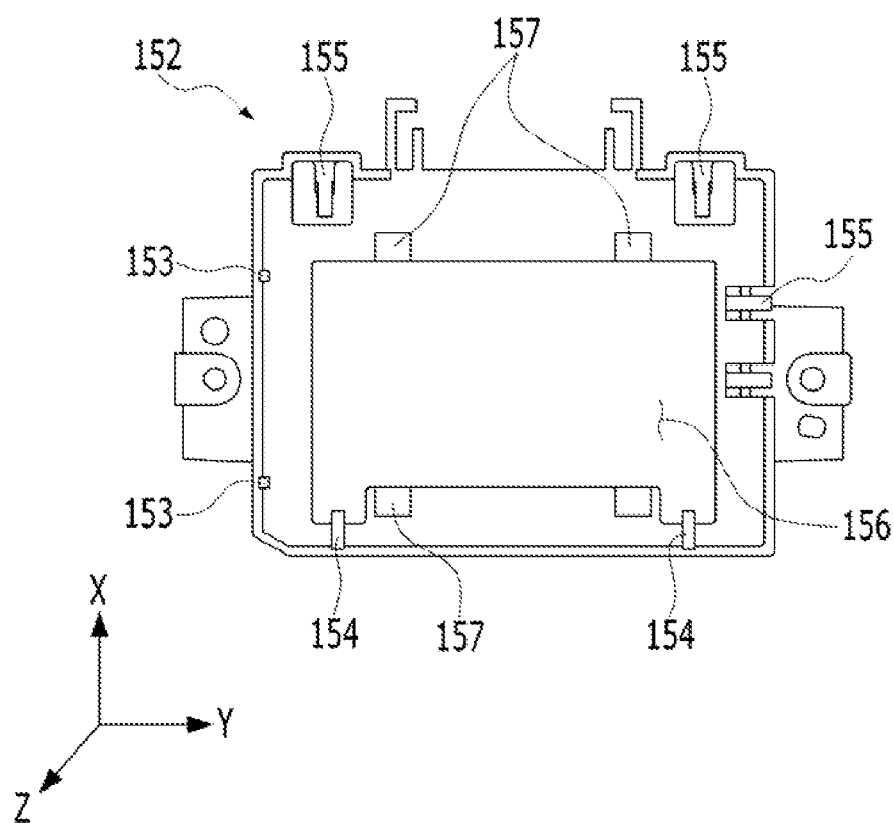
FIG. 11 is a plan view illustrating a lower cover in the head-up display for a vehicle according to the third exemplary embodiment of the present invention.
Figure 12A:
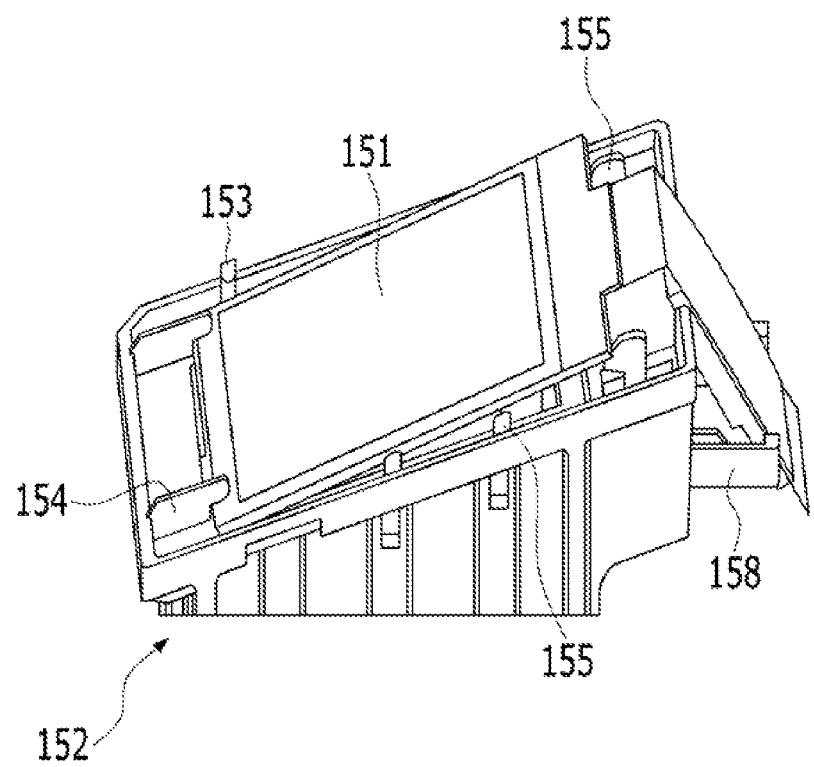
FIGS. 12A, 12B, 13A, and 13B are views illustrating a state in which a liquid crystal display (LCD) is mounted on the lower cover in the head-up display for a vehicle according to the third exemplary embodiment of the present invention.
Figure 12B:
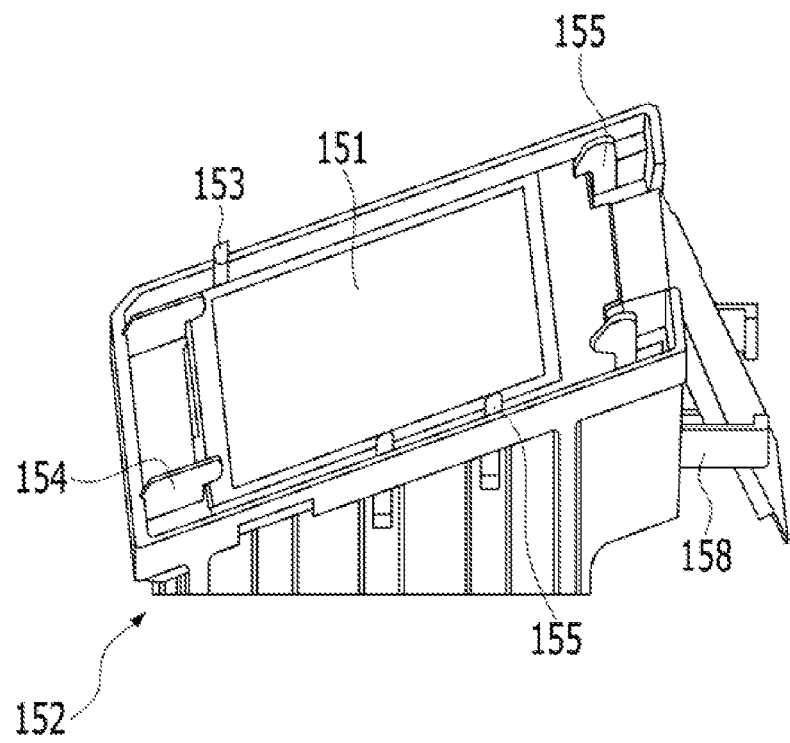
Figure 13A:
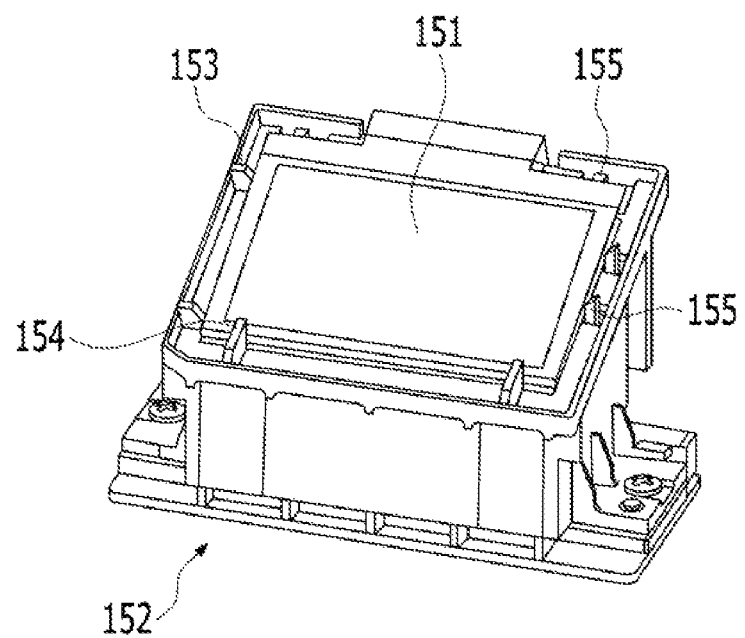
Figure 13B:
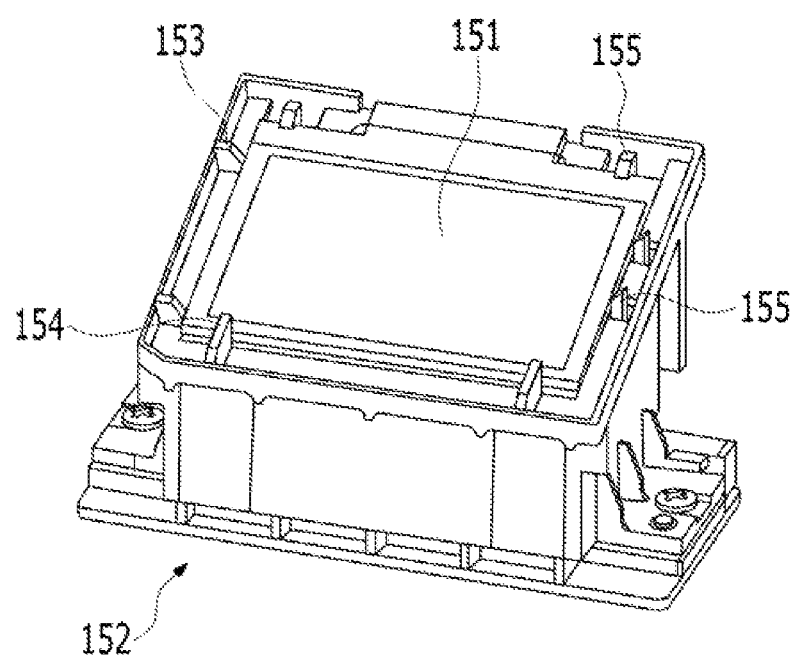

FIG. 11 is a plan view illustrating the lower cover in the head-up display for a vehicle according to the third exemplary embodiment of the present invention.

Referring to FIG. 11, the lower cover 152 includes X-axis line stoppers 153, Y-axis line stoppers 154, and the fixing hooks 155.

The plurality of X-axis line stoppers 153 are formed at a left upper end of front, rear, left, and right upper ends of the lower cover 152 to seat a left side surface of the LCD (see of 151 of FIG. 9).

In this case, front, right, left, and right directions indicated in FIG. 11 will be described exactly as shown in the drawing.

The plurality of Y-axis line stoppers 154 are formed at the rear upper end to seat a rear side surface of the LCD (see 151 of FIG. 9).

The plurality of fixing hooks 155 are formed at the front and right upper ends. The fixing hooks 155 push the LCD (151 in FIG. 9) in the directions of the X- and Y-axis line stoppers.

The lower cover 152 has an opening 156 in a central portion thereof. Seating surfaces 157 in surface contact with the LCD (see 151 of FIG. 9) are formed around the opening 156.

In this case, an uneven portion may be formed in the seating surface 157 to seat the LCD (see 151 of FIG. 9) without slipping.

The uneven portion is formed in a shape having predetermined surface roughness.

As a result, the fixing hooks 155 push the LCD (see 151 of FIG. 9) in the Z-axis direction based on the X-axis line stopper 153 and the Y-axis line stopper 154 to fix the LCD 151.

In other words, the fixing hook 155 has a structure that pushes the LCD (see 151 of FIG. 9) from the front to the rear and from the right to the left and pushes and fixes the LCD (see 151 of FIG. 9) in the Z-axis direction with a resultant force.

FIGS. 12A to 12B and 13A to 13B are views illustrating a state in which the LCD is mounted on the lower cover in the head-up display for a vehicle according to the third exemplary embodiment of the present invention.

Referring to FIGS. 12A to 12B and 13A to 13B together, a process of assembling the LCD 151 to the lower cover 152 can be confirmed.

First, the LCD 151 is pushed into a lower end of the Y-axis line stopper 154 based on the X-axis line stopper 153 and the Y-axis line stopper 154.

In this case, the fixing hook 155 comes into contact with the LCD 151 to be elastically deformed in a direction opposite to a contact direction thereof.

Here, when a force is additionally applied, the LCD 151 is seated at the X-axis line stopper 153 and the Y-axis line stopper 154, and the fixing hook 155 returns to the initial position thereof so that the LCD 151 is fixed to the seating surfaces (see 157 of FIG. 11).

Figure 14:
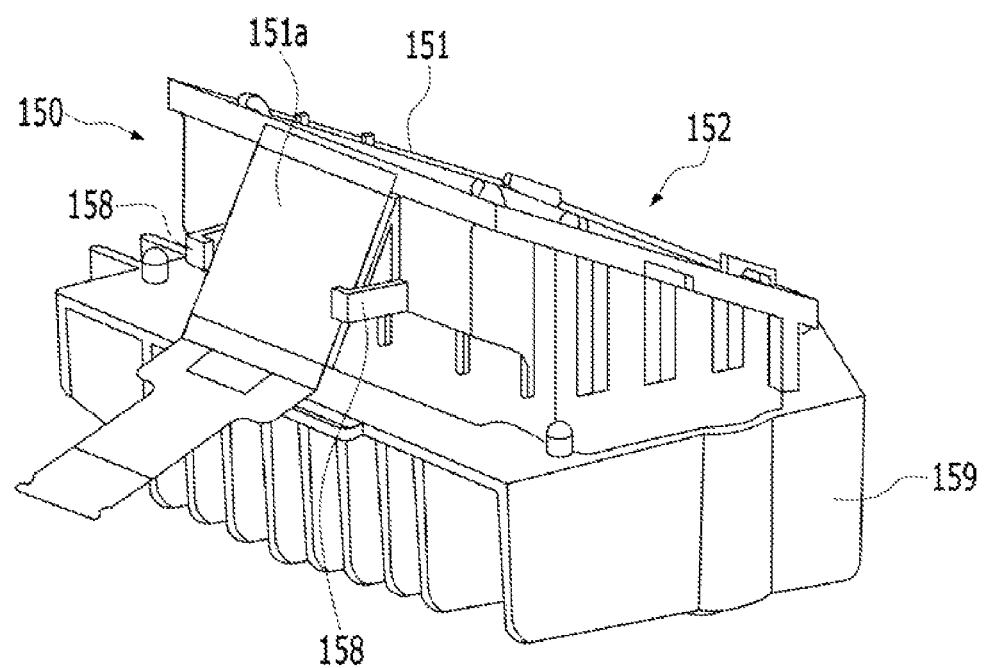
FIG. 14 is a view illustrating a guide member for fixing an LCD cable in the head-up display for a vehicle according to the third embodiment of the present invention.

FIG. 14 is a view illustrating a guide member for fixing an LCD cable in the head-up display for a vehicle according to the third embodiment of the present invention.

Referring to FIG. 14, the lower cover 152 of the picture generation unit 150 includes a guide member 158 for fixing an LCD cable 151a at a rear side of a side at which the LCD 151 is mounted.

The guide member 158 is formed in a form surrounding both ends of the LCD cable 151a.

As described above, according to the present invention, the screen is coupled in four directions, thereby increasing assembly rigidity, and the snap joint is used instead of a screw, thereby reducing costs.

In particular, according to the present invention, the picture generation unit is assembled to the lower cover without a separate upper cover, thereby reducing costs through component reduction while maintaining assembly precision.

The present invention is not limited to the above-described embodiments and can be variously modified and implemented without departing from the scope and spirit of the present invention.

What is claimed is:

1. A head-up display for a vehicle having a reinforced assembly structure, the head-up display comprising a picture generation unit which includes a lower cover configured to fix a liquid crystal display (LCD) in X-, Y-, and Z-axis directions;

wherein the lower cover has a structure snap-fit-coupled with the LCD; and wherein the lower cover includes:

a plurality of X-axis line stoppers formed at a left upper end of a front upper end, a rear upper end, the left upper end, and a right upper end of the lower cover to seat a left side surface of the LCD;

a plurality of Y-axis line stoppers formed at the rear upper end to seat a rear side surface of the LCD; and a plurality of fixing hooks formed at the front and right upper ends to push the LCD in directions of the X- and Y-axis line stoppers.

2. The head-up display of claim 1, wherein a coupling portion of the fixing hook in contact with the LCD is inclined upward.

3. The head-up display of claim 2, wherein an inclination angle of the coupling portion is an acute angle.

4. The head-up display of claim 1, wherein the lower cover has an opening in a central portion thereof, and seating surfaces in surface contact with the LCD are formed around the opening.

5. The head-up display of claim 1, wherein the lower cover includes a guide member configured to fix an LCD cable.

* * * * *